United States Patent
Zhang et al.

(10) Patent No.: US 9,398,475 B2
(45) Date of Patent: Jul. 19, 2016

(54) METHOD, DEVICE, AND SYSTEM FOR MONITORING QUALITY OF INTERNET ACCESS SERVICE OF MOBILE TERMINAL

(71) Applicant: Huawei Technologies Co., Ltd., Shenzhen (CN)

(72) Inventors: Hongding Zhang, Guangzhou (CN); Wei Zhou, Hangzhou (CN); Kun Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 91 days.

(21) Appl. No.: 14/315,653

(22) Filed: Jun. 26, 2014

(65) Prior Publication Data
US 2014/0334326 A1 Nov. 13, 2014

Related U.S. Application Data

(63) Continuation of application No. PCT/CN2012/086297, filed on Dec. 10, 2012.

(30) Foreign Application Priority Data

Dec. 26, 2011 (CN) .......................... 2011 1 0461590

(51) Int. Cl.
*H04W 24/02* (2009.01)
*H04W 24/08* (2009.01)
(Continued)

(52) U.S. Cl.
CPC ................ *H04W 24/02* (2013.01); *H04W 4/00* (2013.01); *H04W 24/08* (2013.01); *H04W 24/10* (2013.01); *H04W 80/04* (2013.01)

(58) Field of Classification Search
None
See application file for complete search history.

(56) References Cited

U.S. PATENT DOCUMENTS 7,929,450 B2   4/2011   Dolganow et al.
8,339,959 B1 * 12/2012  Moisand ............. H04L 63/0236
                                                          370/235

(Continued)

FOREIGN PATENT DOCUMENTS

CN       1859227 A      11/2006
CN     102014419 A       4/2011
(Continued)

OTHER PUBLICATIONS

Partial English Translation and Abstract of Chinese Patent Application No. CN102752792A, Part 1, Aug. 25, 2014, 9 pages.
(Continued)

*Primary Examiner* — Kodzovi Acolatse
(74) *Attorney, Agent, or Firm* — Conley Rose, P.C.; Grant Rodolph

(57) ABSTRACT

A method, a device, and a system for monitoring quality of an Internet access service of a mobile terminal are provided. The method includes collecting, by a mobile terminal, an IP data packet of an Internet access service, identifying, by the mobile terminal, an Internet access service type corresponding to the IP data packet, performing, by the mobile terminal, deep packet resolution on the IP data packet to obtain a resolution result, collecting statistics, by the mobile terminal, on a key quality indicator of the Internet access service corresponding to the Internet access service type according to the resolution result of the IP data packet, and uploading, by the mobile terminal, the key quality indicator obtained by means of statistics to a network server, so that the network server monitors quality of the Internet access service of the mobile terminal according to the key quality indicator.

17 Claims, 4 Drawing Sheets

(51) Int. Cl.
*H04W 4/00* (2009.01)
*H04W 80/04* (2009.01)
*H04W 24/10* (2009.01)

(56) References Cited

U.S. PATENT DOCUMENTS

| | | | |
|---|---|---|---|
| 2003/0055883 A1* | 3/2003 | Wiles, Jr. | G06F 11/3414 709/203 |
| 2003/0110249 A1* | 6/2003 | Buus | G06Q 30/02 709/224 |
| 2005/0042987 A1 | 2/2005 | Lee et al. | |
| 2006/0034185 A1* | 2/2006 | Patzschke | H04L 12/2697 370/252 |
| 2007/0124487 A1 | 5/2007 | Yoshimoto et al. | |
| 2009/0109854 A1* | 4/2009 | Rajpathak | H04L 29/12066 370/238 |
| 2009/0138593 A1* | 5/2009 | Kalavade | G06Q 10/0637 709/224 |
| 2009/0296613 A1 | 12/2009 | Kahn et al. | |
| 2009/0311989 A1 | 12/2009 | Duan et al. | |
| 2010/0037318 A1 | 2/2010 | French et al. | |
| 2010/0189004 A1 | 7/2010 | Mirandette et al. | |
| 2013/0019009 A1* | 1/2013 | Tremblay | G06Q 30/02 709/224 |

FOREIGN PATENT DOCUMENTS

| | | |
|---|---|---|
| CN | 102104900 A | 6/2011 |
| CN | 102752792 A | 10/2012 |
| JP | 2003110738 A | 4/2003 |
| JP | 2003264609 A | 9/2003 |
| JP | 2005005836 A | 1/2005 |
| JP | 20070150665 A | 6/2007 |
| JP | 2009515464 A | 4/2009 |
| RU | 2361373 C2 | 7/2009 |
| RU | 2434341 C2 | 11/2011 |
| WO | 2008018756 A1 | 2/2008 |
| WO | 2009021049 A2 | 2/2009 |
| WO | 2010037318 A1 | 4/2010 |

OTHER PUBLICATIONS

Partial English Translation and Abstract of Chinese Patent Application No. CN102752792A, Part 2, Aug. 25, 2014, 4 pages.
Partial English Translation and Abstract of Chinese Patent Application No. CN001859227A, Sep. 20, 2014, 9 pages.
"End-to-End User Perception Evaluation System Modeling Process in the PS Domain," Dec. 10, 2011, 29 pages.
English Translation of "End-to-End User Perception Evaluation System Modeling Process in the PS Domain," Dec. 10, 2011, 29 pages.
Foreign Communication From a Counterpart Application, Chinese Application No. 201110461590.4, Chinese Office Action dated May 4, 2014, 7 pages.
Foreign Communication From a Counterpart Application, PCT Application No. PCT/CN2012/086297, English Translation of International Search Report dated Mar. 14, 2013, 3 pages.
Foreign Communication From a Counterpart Application, PCT Application No. PCT/CN2012/086297, English Translation of Written Opinion dated Mar. 14, 2013, 6 pages.
Foreign Communication From a Counterpart Application, European Application No. 12861197.7, Extended European Search Report dated Nov. 24, 2014, 5 pages.
Partial English Translation and Abstract of Japanese Patent Application No. JPA2003110738, Sep. 23, 2015, 26 pages.
Partial English Translation and Abstract of Japanese Patent Application No. JPA2003264609, Sep. 23, 2015, 48 pages.
Partial English Translation and Abstract of Japanese Patent Application No. JPA2005005836, Sep. 23, 2015, 68 pages.
Partial English Translation and Abstract of Japanese Patent Application No. JPA2007150665, Sep. 23, 2015, 40 pages.
Partial English Translation and Abstract of Japanese Patent Application No. JPA2009515464, Sep. 23, 2015, 53 pages.
"Add new application types and new application scenarios to PCC," 3GPP TSG SA WG2 Architecture—S2#58, S2-072717, Jun. 25-29, 2007, 3 pages.
"DIDA and the additional burden on ANDSF," SA WG2 Meeting #86, S2-113321, Jul. 11-15, 2011, 4 pages.
Foreign Communication From a Counterpart Application, Japanese Application No. 2014-549330, Japanese Office Action dated Aug. 4, 2015, 4 pages.
Foreign Communication From a Counterpart Application, Japanese Application No. 2014-549330, English Translation of Japanese Office Action dated Aug. 4, 2015, 4 pages.
Foreign Communication From a Counterpart Application, Russian Application No. 201413102.9, Russian Notice of Allowance dated Jan. 14, 2016, 15 pages.
Foreign Communication From a Counterpart Application, Russian Application No. 2014131029 (PCT/CN2012/086297), Russian Letter of Official Decision of Grant dated Jan. 28, 2016, 4 pages.

* cited by examiner

METHOD, DEVICE, AND SYSTEM FOR MONITORING QUALITY OF INTERNET ACCESS SERVICE OF MOBILE TERMINAL

CROSS-REFERENCE TO RELATED APPLICATIONS

This application is a continuation of International Application No. PCT/CN2012/086297, filed on Dec. 10, 2012, which claims priority to Chinese Patent Application No. 201110461590.4, filed on Dec. 26, 2011, both of which are hereby incorporated by reference in their entireties.

TECHNICAL FIELD

The present disclosure relates to the communications field, and in particular, to a method, a device, and a system for monitoring quality of an Internet access service of a mobile terminal.

BACKGROUND

To ensure service quality of mobile terminal users is a very crucial task of network service providers. By knowing users' experience of their services, a network service provider can accordingly formulate an optimized policy and adjust resource configuration, so as to make services accepted by more users and to constantly improve service capabilities of the network service provider. Moreover, the network service provider can perform comparison and analysis effectively according to a competition environment to learn a status thereof in competition and to identify weaknesses of its own and those of competitors, so as to sharpen competitive edges of its own and take advantage of the weaknesses of the competitors to gain an initiative in competition.

A network management system constructed based on a conventional service quality monitoring mode can monitor only average network service quality of a backbone network element device, such as a radio access network (RAN) side, a core network, and a gateway side. Therefore, a probe solution is proposed in the prior art. The solution, by using probe systems of a RAN side, a core network side, and a service gateway side, monitor interfaces, such as Iu-PS, Gb, Gn, Gi, and Gw, and is capable of monitoring a network experience indicator of users of an entire network. However, the solution is still limited to monitoring wireless service network quality on a link from a base station to the Internet, and cannot monitor a network key quality index (KQI) from the base station to a mobile terminal user.

Therefore, how to learn operation quality of a wireless service, especially to accurately monitor experience of a mobile user on Internet access service quality, is a technical issue that needs to be solved urgently for wireless operators.

SUMMARY

Embodiments of the present disclosure provide a method, a device and, a system for monitoring quality of an Internet access service of a mobile terminal, so as to implement monitoring of quality of an Internet access service of a mobile user.

For this purpose, the embodiments of the present disclosure provide the following

TECHNICAL SOLUTIONS

A method for monitoring quality of an Internet access service of a mobile terminal includes collecting, by the mobile terminal, an Internet Protocol (IP) data packet of an Internet access service, identifying, by the mobile terminal, an Internet access service type corresponding to the IP data packet, performing, by the mobile terminal, deep packet resolution on the IP data packet to obtain a resolution result, collecting statistics, by the mobile terminal, on a key quality indicator of the Internet access service corresponding to the Internet access service type according to the inspection result of the IP data packet, and uploading, by the mobile terminal, the key quality indicator obtained by means of statistics to a network server, so that the network server monitors quality of the Internet access service of the mobile terminal according to the key quality indicator.

A mobile terminal includes a collecting unit configured to collect an IP data packet of an Internet access service, a deep packet identification unit coupled to the collecting unit and configured to identify an Internet access service type corresponding to the IP data packet, a deep packet resolution unit coupled to the collecting unit and configured to perform deep packet resolution on the IP data packet to obtain a resolution result, a statistics collecting unit coupled to the deep packet identification unit and the deep packet resolution unit and configured to collect statistics on a key quality indicator of the Internet access service corresponding to the Internet access service type according to the resolution result of the IP data packet, and an uploading unit coupled to the statistics collecting unit and configured to upload the key quality indicator obtained by the statistics collecting unit by means of statistics to a network server, wherein the network server monitors quality of the Internet access service of the mobile terminal according to the key quality indicator.

A system for monitoring quality of an Internet access service of a mobile terminal includes a mobile terminal and a network server, wherein the mobile terminal is configured to collect an IP data packet of the Internet access service, identify an Internet access service type corresponding to the IP data packet, perform deep packet resolution on the IP data packet to obtain a resolution result, collect statistics on a key quality indicator of the Internet access service corresponding to the Internet access service type according to the resolution result of the IP data packet, and upload the key quality indicator obtained by means of statistics to the network server, and the network server is configured to receive the key quality indicator uploaded by the mobile terminal, and monitor quality of the Internet access service of the mobile terminal according to the key quality indicator.

According to the method, the device, and the system for monitoring quality of an Internet access service of a mobile terminal provided by an embodiments of the present disclosure, a mobile terminal collects an IP data packet of an Internet access service, identifies an Internet access service type corresponding to the IP data packet, performs deep packet resolution on the IP data packet, collects statistics on a key quality indicator of the Internet access service corresponding to the Internet access service type according to a resolution result of the IP data packet, and uploads the key quality indicator obtained by means of statistics to a network server, so that the network server monitors quality of the Internet access service of the mobile terminal according to the key quality indicator, thereby implementing accurate monitoring of network quality for the mobile terminal, improving a wireless network operation and maintenance capability of an operator, and providing an accurate decision-making basis for network optimization.

BRIEF DESCRIPTION OF DRAWINGS

To describe the technical solutions in the embodiments of the present application or in the prior art more clearly, the following briefly introduces the accompanying drawings required in the embodiments. The accompanying drawings in the following description show merely some embodiments of the present disclosure, and a person of ordinary skill in the art may still derive other drawings from these accompanying drawings.

DESCRIPTION OF EMBODIMENTS

In order to make a person skilled in the art better understand solutions of embodiments of the present disclosure, the embodiments of the present disclosure are further described in detail in the following with reference to the accompanying drawings and implementation manners.

According to a method and an apparatus for monitoring quality of an Internet access service of a mobile terminal in the embodiments of the present disclosure, by planting a deep packet inspection (DPI) technology at a mobile terminal side, a mobile terminal is configured to collect an IP data packet of an Internet access service, perform identification and resolution on the IP data packet, collect statistics on a KQI of the Internet access service of the mobile terminal side according to a resolution result, and upload the KQI obtained by means of statistics to a network server, so that the network server monitors quality of the Internet access service of the mobile terminal according to the key quality indicator, thereby implementing accurate monitoring of network quality of the mobile terminal.

Figure 1:
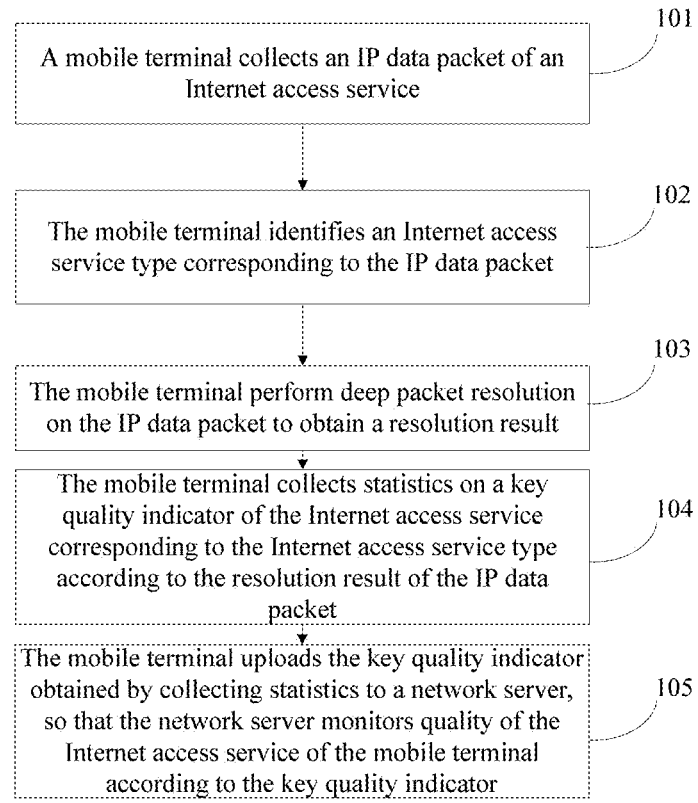
FIG. 1 is a flowchart of a method for monitoring quality of an Internet access service of a mobile terminal according to an embodiment of the present disclosure.

FIG. 1 is a flowchart of a method for monitoring quality of an Internet access service of a mobile terminal according to an embodiment of the present disclosure, where the method includes the following steps:

Step 101: A mobile terminal collects an IP data packet of an Internet access service.

Figure 2:
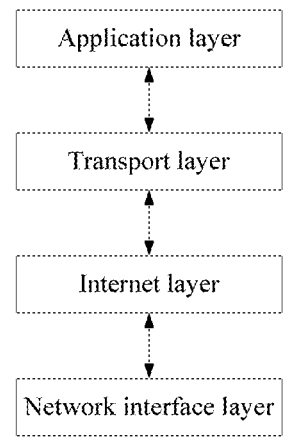
FIG. 2 is a schematic diagram of a four-layer architecture of an existing standard TCP/IP network.

Because a data path of a voice service and a data path of the Internet access service of the mobile terminal are separated, and the IP data packet of the Internet access service has a fixed transmission path, the IP data packet of the Internet access service may be obtained by using the transmission path. A four-layer architecture of a standard Transmission Control protocol (TCP)/IP network includes a network interface layer, an Internet layer, a transmission layer, and an application layer, as shown in FIG. 2. The IP data packet is located at the Internet layer. In an embodiment of the present disclosure, in one implementation manner, an IP data packet at the Internet layer of the TCP/IP four-layer model may be collected, and the obtained IP data packet is cached for identification and resolution later. In another implementation manner, an IP data packet at the Internet layer is screened based on an Internet access service port. For example, the mobile terminal starts two Internet access services of a QQ client and (Hypertext Transfer Protocol) HTTP web browsing; a mobile phone may detect a port range corresponding to a process corresponding to the QQ client so as to isolate all flows belonging to the QQ client at the Internet layer, where the remaining IP data packet at the Internet layer belongs to HTTP web browsing.

Step 102: The mobile terminal identifies an Internet access service type corresponding to the IP data packet.

Each Internet access service has a corresponding feature. Therefore, in an embodiment of the present disclosure, the IP data packet may be identified in a plurality of different identifying manners, for example, identifying methods such as port identification, feature identification, and correlation identification, so as to identify an Internet access service type of a quintuple flow in the IP data packet, which are described separately with reference to examples. Any one or more identifying manners of port identification, feature identification, and correlation identification may be used to identify the Internet access service type corresponding to the IP data packet.

(1) Port Identification

For some protocols stipulated by standard protocol specifications, a well-known port may be used to perform identification.

For example, for the Domain Name System (DNS) protocol, the well-known port 53 of DNS may be used to perform identification.

(2) Feature Identification

Many protocol message packets include some special keywords, where these keywords may be located at a fixed position or a variable position. These keywords form a content feature of the protocol message packets.

For example, a HTTP message packet includes keywords, such as "GET", "POST", "HTTP/1.1", and "HOST". If these keywords included in the IP data packet are identified, it may be determined that the Internet access service type corresponding to the IP data packet is a HTTP web browsing service.

(3) Correlation Identification

For some services, a control flow and a service flow are separated, and the service flow has no feature. In this case, a correlation identification technology may be used. Specifically, the control flow may be identified first; deep packet resolution may be performed on the control flow according to a protocol of the control flow; and then the corresponding service flow is identified from protocol content (IP and port information).

For example, for a File Transfer Protocol (FTP) file transfer service, an FTP negotiation control flow is identified first;

then, related feature (IP and port) information of a data flow thereof is obtained by resolving the FTP control flow; and later, the FTP data flow is identified by using the feature information.

Certainly, in an actual application, the Internet access service type corresponding to the IP data packet may be identified in one single identifying manner, and the Internet access service type corresponding to the IP data packet may also be identified comprehensively in a plurality of identifying manners.

For example, a common port of a HTTP web browsing service is (80, 8080). Therefore, the HTTP web browsing service may be identified by using the port and matching a request method of a method name specified by the HTTP protocol, such as, "Get", "POST", or "PUT", and a HTTP version information field ("HTTP/0.9", "HTTP/1.0", or "HTTP/1.1"). For another example, for an FTP file transfer service, based on the FTP standard protocol, the FTP file transfer service may be identified by identifying a standard response field, such as 220/226, and a port feature.

For different Internet access service types, deep packet inspection DPI is required to identify a related protocol message; moreover, in some cases, whether some related protocol messages belong to a same web page needs to be further determined. For "Get Request", "200 OK", and "Data.n" messages, whether they belong to a same web page may be determined based on a quintuple; that is, all flows of the same web page are determined based on the quintuple.

The foregoing identification process mainly includes Open Systems Interconnection (OSI) layer 3 (L3)/OSI layer 4 (L4) layer shallow protocol identification, OSI layer 7 (L7)/OSI layer 7+ (L7+) layer deep protocol identification, and so on.

Step 103: The mobile terminal performs deep packet resolution on the IP data packet to obtain a resolution result.

Step 104: The mobile terminal collects statistics on a key quality indicator of the Internet access service corresponding to the Internet access service type according to the resolution result of the IP data packet.

Because the Internet access service may have a plurality of different service types, such as, a HTTP web browsing service, a Wireless Application Protocol (WAP) service, an FTP service, a DNS service, and a TCP service, for a different Internet access service, statistics may be collected on a corresponding key quality indicator according to the resolution result of the IP data packet of the service. For example:

For the HTTP web browsing service or the WAP service, a network-layer IP data packet of the HTTP web browsing service or the WAP service may be resolved to determine whether the network-layer IP data packet includes a message representing a following event: a HTTPHomePageRequest event, a HTTPHomePageResponse event, a HTTPGet event, a HTTPFail event, a HTTPDataTransferStart event, and a HTTPDataTransferComplete event. The resolution result may include one or more of the foregoing events.

According to the foregoing events, statistics may be collected on one or more indicators of these services, such as a home page response success rate, a home page response duration, a page refresh success rate, a page refresh duration, and a page download rate. Specifically, statistics may be collected on the home page response success rate and the home page response duration of the Internet access service according to the HTTPHomePageRequest event and the HTTPHomePageResponse event during a set period of time; statistics may be collected on the page refresh success rate according to the HTTPGet event and the HTTPFail event during a set period of time; and statistics may be collected on the refresh duration and the download rate according to the HTTPDataTransferStart event and the HTTPDataTransferComplete event.

For the FTP service, a network-layer IP data packet of the FTP service may be resolved to determine whether the network-layer IP data packet includes a message representing a following event: an FTPConnectionRequest event, an FTPConnectionResponse event, an FTPULDataTransferStart event, an FTPULDataTransferComplete event, an FTPULFirstDataPacket event, an FTPULLastDataPacket event, an FTPDLDataTransferStart event, an FTPDLDataTransferComplete event, an FTPDLFirstDataPacket event, and an FTPDLLastDataPacket event. The resolution result may include one or more of the foregoing events.

According to the foregoing events, statistics may be collected on one or more indicators of the FTP service, such as a connection establishment success rate, a connection establishment duration, an average upload rate, and an average download rate. Specifically, statistics may be collected on the connection establishment success rate and the connection establishment duration of the FTP service according to the FTPConnectionRequest event and the FTPConnectionResponse event during a set period of time; statistics may be collected on the average upload rate of the FTP service according to the FTPULDataTransferStart event, the FTPULDataTransferComplete event, the FTPULFirstDataPacket event, and the FTPULLastDataPacket event; and statistics may be collected on the average download rate of the FTP service according to the FTPDLDataTransferStart event, the FTPDLDataTransferComplete event, the FTPDLFirstDataPacket event, and the FTPDLLastDataPacket event.

For the DNS service, a network-layer IP data packet of the DNS service may be resolved to determine whether the network-layer IP data packet includes a message representing a following event: a DNSResponse event or a DNSQuery event. According to the DNSQuery event and the DNSResponse event during a set period of time, statistics may be collected on a resolution success rate of the DNS service and/or a resolution delay of the DNS service.

For the TCP service, a network-layer IP data packet of the TCP service may be resolved to determine whether the network-layer IP data packet includes a message representing a following event: a TCPSYNAttempt event or a TCP_ACK event. According to the TCPSYNAttempt event and the TCP_ACK event during a set period of time, statistics may be collected on an establishment success rate of the TCP service and/or an establishment delay of the TCP service.

Specifically, after the service type of the IP data packet is identified, the corresponding Internet access service is resolved according to a standard protocol format of the service type, including L7/L7+ layer protocol resolution, and so on.

For example, for the HTTP web browsing service, a specific Method and a response, such as Get and 200 OK, corresponding to content of each field of a first line (First line) is resolved according to the HTTP protocol standard, so as to determine whether a web page link request is successful; and a KQI indicator, such as a time point, a statistics duration, and a page download rate, corresponding to each request/response event is recorded. A specific process will be exemplified in detail in the following.

For a WAP 1.X Internet access service, request and response fields, such as GET and 200 OK, may be identified by resolving, according to the WAP standard protocol, a protocol data unit (PDU) TYPE field and a STATUS field, so as to determine whether a web page link request is successful; and a KQI indicator, such as a time point, a statistics duration, and a page download rate, corresponding to each request/response event is recorded.

For the FTP file transfer service, a connection request field, such as SYN/SYN and ACK/ACK, and a response field respectively using 220/226 as a flag may be resolved according to the FTP standard protocol, so as to determine whether an FTP link is successful and whether file transfer is complete; a SIZE field may be resolved to obtain a file size; and a KQI indicator, such as a time point, a statistics duration, and a file transfer size, corresponding to each request/response event is recorded.

For the DNS service, DNS Query and DNS Response fields and corresponding time points may be resolved; and statistics are collected on a success rate and a delay according to a response result.

For the TCP service, a three-way handshake process of TCP SYN Attempt, TCP SYN ACK, and ACK, and corresponding time points may be resolved to collect statistics on a success rate and a delay.

A specific process of collecting statistics on a key quality indicator for different services will be described in the following.

Step 105: The mobile terminal uploads the key quality indicator obtained by means of statistics to a network server, so that the network server monitors quality of the Internet access service of the mobile terminal according to the key quality indicator.

It should be noted that, in an actual application, for different types of Internet access services, statistics may be collected on different indicator items. The indicator items mentioned above for different Internet access services are merely exemplary, which may be specifically determined according to application requirements, and is not limited by an embodiment of the present disclosure.

In addition, a process of uploading the key quality indicator obtained by means of statistics to the network server may be uploading immediately after statistics are collected or uploading periodically. Moreover, after the mobile terminal is powered on, a corresponding application may be started to monitor an Internet access service of the mobile terminal. Once an Internet access service is detected, statistics are collected on a key quality indicator of the Internet access service according to the foregoing procedure, and a statistics result is uploaded to the network server. Certainly, a selection function may also be provided to a user, so that the user determines whether to start the foregoing application to monitor the Internet access service of the mobile terminal. This is not limited by an embodiment of the present disclosure.

Therefore, according to the method for monitoring quality of an Internet access service of a mobile terminal provided by an embodiment of the present disclosure, a mobile terminal collects an IP data packet of an Internet access service, identifies an Internet access service type corresponding to the IP data packet, performs deep packet resolution on the IP data packet, collects statistics on a key quality indicator of the Internet access service according to a resolution result of the IP data packet, and uploads the key quality indicator obtained by means of statistics to a network server, so that the network server monitors quality of the Internet access service of the mobile terminal according to the key quality indicator, thereby implementing accurate monitoring of network quality for the mobile terminal, and providing an accurate decision-making basis for network optimization.

In order to further improve a network operation and maintenance capability of a network side, so as to provide an accurate decision-making basis for network optimization, in another embodiment of the present disclosure, a monitoring policy may further be configured by the network side. In this case, a mobile terminal obtains the monitoring policy from a network server, and monitors an Internet access service according to the monitoring policy. A manner in which the mobile terminal obtains the monitoring policy may be a manner of requesting download by the mobile terminal, delivering actively by the network server, or the like. This is not limited by an embodiment of the present disclosure.

Figure 3:
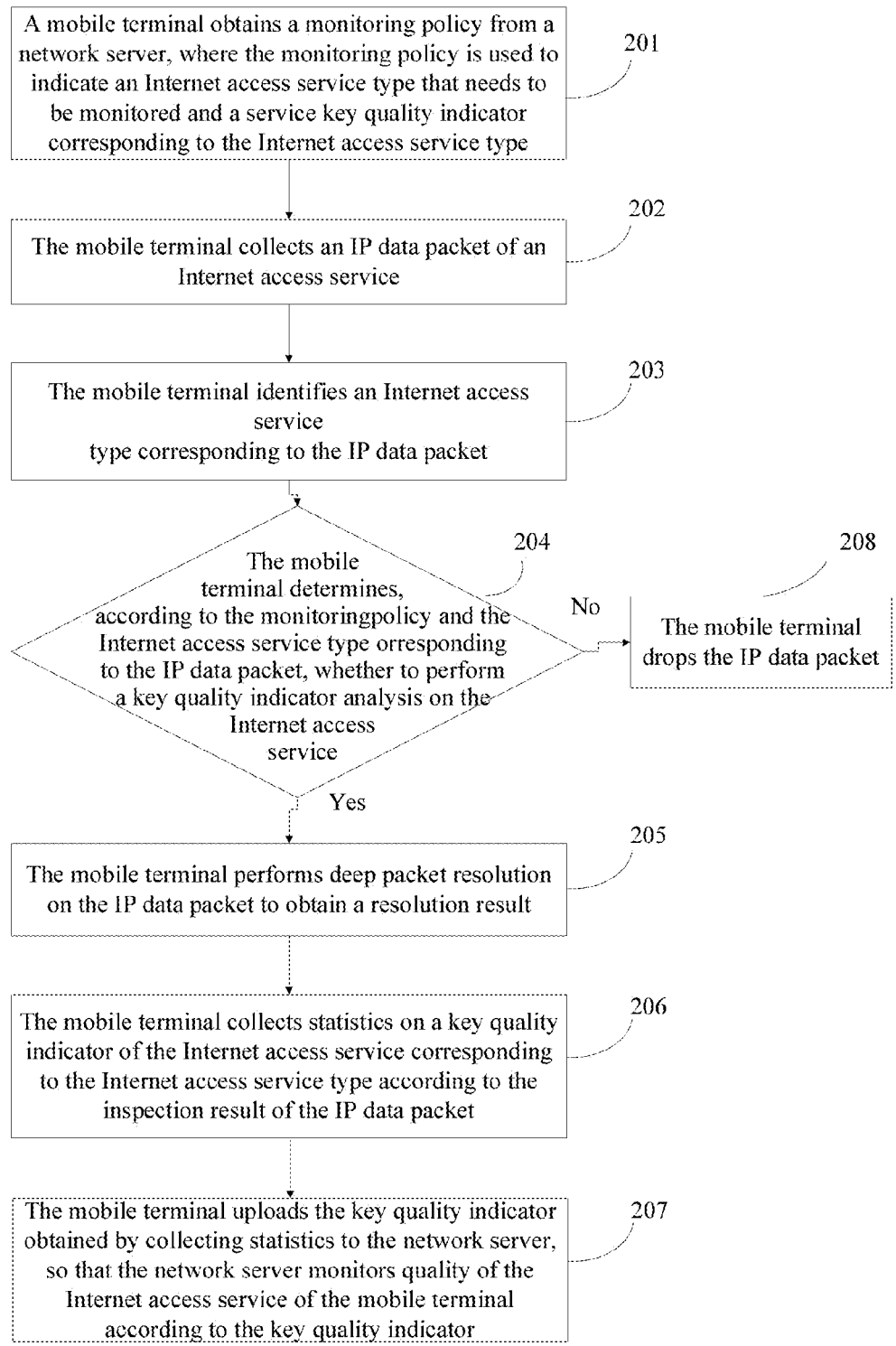
FIG. 3 is another flowchart of a method for monitoring quality of an Internet access service of a mobile terminal according to an embodiment of the present disclosure.

FIG. 3 is another flowchart of a method for monitoring quality of an Internet access service of a mobile terminal according to an embodiment of the present disclosure, where the method includes the following steps:

Step 201: A mobile terminal obtains a monitoring policy from a network server, where the monitoring policy is used to indicate an Internet access service type that needs to be monitored and a service key quality indicator corresponding to the Internet access service type.

Step 202: The mobile terminal collects an IP data packet of an Internet access service.

Step 203: The mobile terminal identifies an Internet access service type corresponding to the IP data packet.

Step 204: The mobile terminal determines, according to the monitoring policy and the Internet access service type corresponding to the IP data packet, whether to perform key quality indicator analysis on the Internet access service, and if it is determined that the key quality indicator analysis be performed on the Internet access service, proceeds to perform step 205; otherwise, proceeds to perform step 208.

Step 205: The mobile terminal performs deep packet resolution on the IP data packet to obtain a resolution result.

Step 206: The mobile terminal collects statistics on a key quality indicator of the Internet access service corresponding to the Internet access service type according to the resolution result of the IP data packet.

Step 207: The mobile terminal uploads the key quality indicator obtained by means of statistics to a network server, so that the network server monitors quality of the Internet access service of the mobile terminal according to the key quality indicator.

Step 208: The mobile terminal drops the IP data packet.

It should be noted that the foregoing step 201 may be performed when the mobile terminal is powered on, or be performed after an update notification of a network side is obtained. If a monitoring policy is locally stored by the mobile terminal, after a new monitoring policy is obtained from the network server, the Internet access service may be monitored according to the new monitoring policy.

Therefore, the method for monitoring the quality of an Internet access service of the mobile terminal provided in an embodiment of the present disclosure includes: by planting a DPI technology at the mobile terminal, monitoring the Internet access service of the mobile terminal, collecting statistics the KQI of the Internet access service of the mobile terminal, and uploading the KQI obtained by means of statistics to the network server, so as so that the network server monitors the quality of an Internet access service of the mobile terminal according to the KQI, thereby implementing precise monitoring of network quality for the mobile terminal, and providing a precise decision-making basis for network planning and optimization of an operator. Moreover, by uniformly configuring the monitoring policy at the network side, the monitoring can be more targeted.

It should be noted that the mobile terminal mentioned in an embodiment of the present disclosure may be a wireless mobile terminal that implements Internet access by using any wireless network technology, such as 2G, 3G, or Long Term Evolution (LTE).

As mentioned in the above, because Internet access services of different types have different features, for a different service type, statistics may be collected on a key quality indicator according to a corresponding message of the type of Internet access service, which is described in detail in the following.

1. For the HTTP web browsing service, messages corresponding to events listed in Table 1 may be identified and resolved.

page; D, which indicates that the user receives a response of a refreshed page; and E, which indicates that the user views content of the refreshed page.

Figure 4:
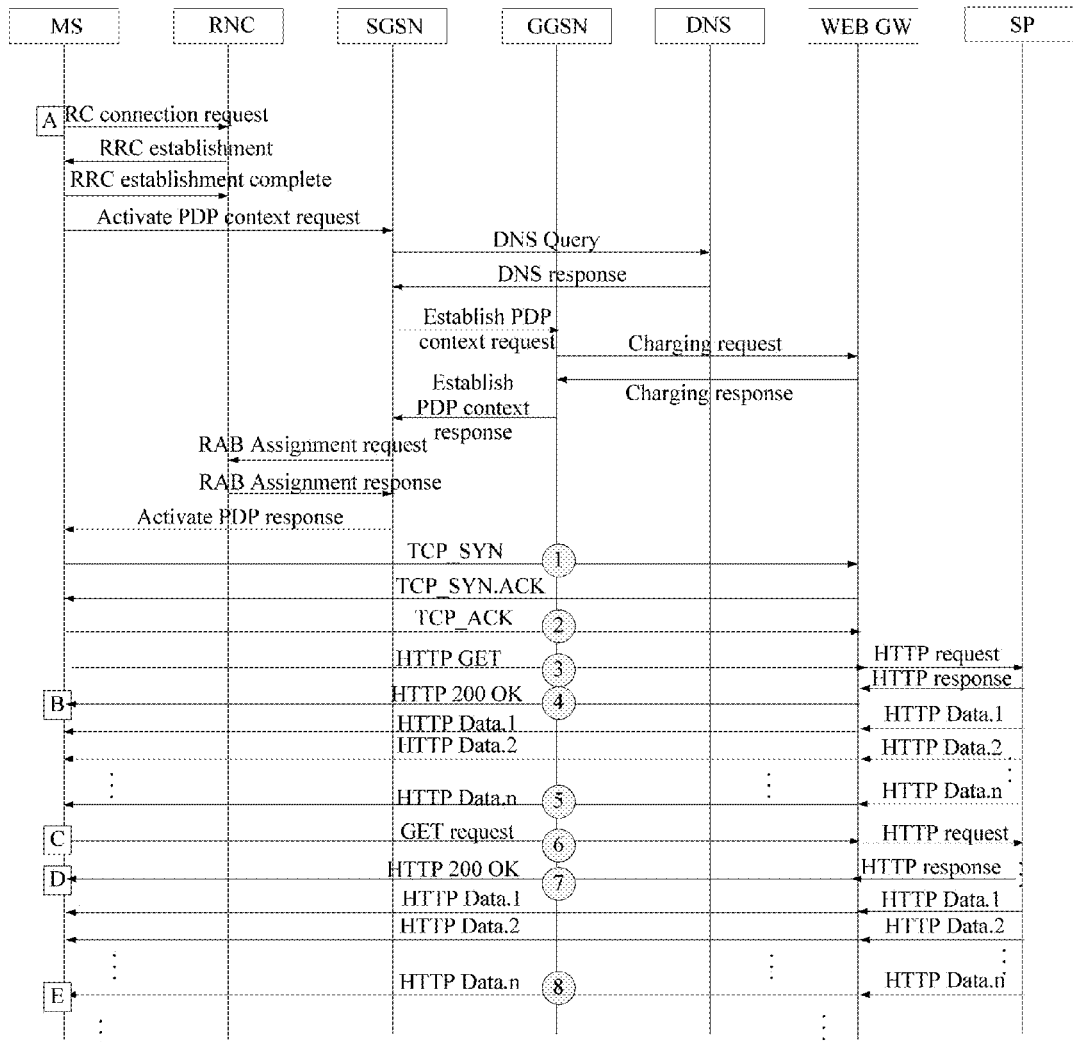
FIG. 4 is a message interaction procedure of a HTTP service of a mobile terminal according to an embodiment of the present disclosure.

A process of collecting statistics on a key quality indicator for a HTTP service according to an embodiment of the present disclosure is exemplified with reference to FIG. 4, in which a serving general packet radio service (GPRS) support node is indicated by SGSN, a gateway GPRS support node is indicated by GGSN, and a radio access bearer is indicated by RAB.

EXAMPLE 1

Is its assumed that a KQI indicator on which statistics need to be collected includes a HTTP home page response success rate and a HTTP home page response duration.

The HTTP home page response success rate refers to a ratio of times of HTTP home page response success to total times of initiating a HTTP home page link; the HTTP home page response duration refers to a period of time from initiating, by a mobile terminal, a first home page link request to receiving a response which is corresponding to the first home page link request.

The mobile terminal initiates a HTTP web page home page link request event, HTTPHomePageRequest; the mobile terminal (MS) initiates an air interface connection request (corresponding to a awareness point A in FIG. 4), that is, an RRC connection request, to a radio base station/radio network con-

TABLE 1

| KQI indicator | Related events | Related protocol message | Remarks |
| --- | --- | --- | --- |
| HTTP home page response success rate | HTTPHomePageRequest | A mobile terminal uploads a radio resource control (RRC) connection request when performing a HTTP service | Unrelated to DPI |
| HTTP home page response duration | HTTPHomePageResponse | A mobile terminal receives a 200 OK message returned by a WAP gateway or a service provider (SP) | |
| HTTP page refresh success rate | | | |
| HTTP page refresh duration | HTTPGet | A user initiates one HTTPGet request | |
| HTTP page download rate | HTTPFail | Message related to a response of HTTP failure | HTTP request initiation failure or timeout |
| | HTTPDataTransferStart | A mobile terminal receives a 200 OK message returned by a WAP gateway or a SP | |
| | HTTPDataTransferComplete | Receive a last data packet transmitted corresponding to one web page | |
| | HTTPAbort | Pending | Indicate that a user exits actively or abnormally |

The HTTP home page response success, HTTPHomePageResponse, means that the mobile terminal receives a success response to a first link request, HTTPHomePageRequest, initiated by the mobile terminal.

FIG. 4 is a message interaction procedure of a mobile terminal HTTP service according to an embodiment of the present disclosure.

Square marks are user awareness points, including A, which indicates that a user clicks a home page; B, which indicates that the user already receives a page response; C, which indicates that the user clicks a link to refresh a web troller (RNC) to establish an RRC link; activates a packet data protocol (PDP) context; establishes a TCP link; and then initiates a HTTP Get request for the HTTP home page. In this case, the mobile terminal receives a 200 OK message returned by a WAP gateway (WEB GW) or a SP; and another value is returned in the case of failure.

For the KQI indicator of home page response success rate, a Method message corresponding to a first line is resolved according to a HTTP standard protocol format; if the Method message is Get, it indicates that the user initiates one HTTP Get request, which is a start event corresponding to the KQI indicator of home page response success rate; then, a response message returned by a server is resolved, which is still a Status code message of a Method response corresponding to the first line, where "200 OK" indicates a success, which is an end event corresponding to the KQI indicator of home page response success rate. Another feedback Status code indicates failure and a reason. Statistics are collected on the start event and the end event during a certain period, and the HTTP home page response success rate is calculated according to a statistics result.

For the KQI indicator of home page response duration, the mobile terminal may record a duration respectively corresponding to the start event and the end event of the home page response success rate, and calculate the home page response duration based on an average value for which statistics are collected on initial and end events during a certain period.

In addition, because each HTTP link is uniquely identified by a quintuple (source IP/port, destination IP/port, and protocol), in a resolution process described above, whether the start event and a response event include the same link of the same web page may be determined according to the unique quintuple.

EXAMPLE 2

It is assumed that a KQI indicator on which statistics needs to be collected includes a HTTP page refresh success rate, and HTTP page refresh duration, and a HTTP page download rate.

The HTTP page refresh success rate refers to a ratio of successfully downloading, by a mobile terminal, a whole web page to the mobile terminal; the HTTP page refresh duration refers to a period of time from starting downloading, by the mobile terminal, a first link of a web page to successfully receiving a response of a last link; and the HTTP page download rate refers to a ratio of a size of a web page downloaded by the mobile terminal to the HTTP page refresh duration.

The mobile terminal initiates one HTTP Get request for a HTTP page; in this case, the mobile terminal receives a HTTP 200 OK message returned by a WAP gateway or a SP; the mobile terminal determines, based on response content, whether it is necessary to continue to send a new link request for the page; if there is a new link request, starts a HTTP-DataTransferStart event, and continues to send one or more HTTP Get requests; the mobile terminal collects statistics on a reply rate of the HTTP Get request and the HTTP 200 OK message, and determines, based on a set threshold, whether the page download is successful.

Therefore, for the KQIs of HTTP page refresh success rate, HTTP page refresh duration, and HTTP page download rate, the HTTP Get request and a plurality of responses, Status code: 200 OK, corresponding to the Get request, need to be resolved similarly. An implementing process of resolving a HTTP Method and a response event is similar to a process of resolving the indicator of HTTP home page response success rate, which will not be described in detail again. The mobile terminal collects statistics on a ratio of success times to page refresh initiation times, and calculates the HTTP page refresh success rate.

The HTTP page refresh duration is obtained by calculating a period of time from the first HTTP Get request event to the last HTTP response event of one HTTP page. Certainly, statistics may also be collected on the HTTP page refresh duration during a certain period, so as to obtain an average HTTP page refresh duration.

A size of a downloaded page may be obtained by resolving a Content length field of the HTTP response event, and a HTTP page download rate may be obtained by calculating a ratio of the size of the downloaded page to the HTTP page refresh duration.

For example, for a KQI of the HTTP web browsing service, it is assumed that a statistics result of the HTTP web browsing service during a certain period of time is shown in Table 2.

TABLE 2

| Record number | Service type ID | Indicator | Start event | Start time | End event | End time | Duration | Domain name | Successful or not | File size bytes |
|---|---|---|---|---|---|---|---|---|---|---|
| 1 | HTTP | Home page response duration | HTTP Get | 2011/10/5 20:05:10 | 200 OK | 2011/10/5 20:05:15 | 5 s | Baidu | Y | 1036 |
| 2 | HTTP | Home page response duration | HTTP Get | 2011/10/5 20:10:10 | 200 OK | 2011/10/5 20:10:20 | 10 s | Sina | Y | 2046 |
| 3 | HTTP | Page refresh duration | HTTP Get | 2011/10/5 20:11:10 | 200 OK | 2011/10/5 20:11:16 | 6 s | Sina | Y | 2100 |
| 4 | HTTP | Page refresh duration | HTTP Get | 2011/10/5 20:12:10 | 300 OK | 2011/10/5 20:12:20 | 10 s | Sina | N | 2046 |
| 5 | HTTP | Home page response duration | HTTP Get | 2011/10/6 21:05:10 | 200 OK | 2011/10/6 21:05:15 | 5 s | Google | Y | 1036 |

According to the record in Table 2, a corresponding KQI may be obtained by calculation as follows.

Home page response success rate: success times/web browsing times=5/5=100%.

Home page response duration: Σtotal duration/home page browsing times=(5+10+6+10+5)/5=7.2 seconds.

Page refresh duration: Σtotal page refresh duration/page refresh times=(6+10)/2=8.

Page download rate: Σtotal web page size/Σtotal web page response duration=(1036+2046+2100+2046+1046)/(5+10+6+10+5)=229 Bytes/second.

2. For the WAP service, messages corresponding to events listed in Table 3 may be identified and resolved.

TABLE 3

| KQI indicator | Related events | Related protocol message | Remarks |
|---|---|---|---|
| WAP home page response success rate WAP home page | WAPHomePageRequest | A mobile terminal uploads an RRC connection request when performing a WAP service | |

TABLE 3-continued

| KQI indicator | Related events | Related protocol message | Remarks |
|---|---|---|---|
| response duration WAP page refresh success rate | WAPHomePageResponse | A mobile terminal receives a 200 OK message returned by a WAP gateway or a SP | |
| WAP page refresh duration | WAPGet | A user initiates one Get request | |
| WAP page download rate | WAPFail | Message related to a response of WAP failure | WAP request initiation failure or timeout |
| | WAPDataTransferStart | Receive a first data packet transmitted by a web page | |
| | WAPDataTransferComplete | Receive a last data packet transmitted corresponding to one web page | |
| | WAPAbort | Pending | Indicate that a user exits actively or abnormally |

A WAP Internet access service data packet adopts Header encapsulation in a HTTP Internet access service data packet, where the Header encapsulation is removed in a resolution process. A process of collecting statistics on all KQIs thereof is the same as that of the HTTP web browsing service.

3. For the FTP service, messages corresponding to events listed in Table 4 may be identified and resolved.

TABLE 4

| KQI indicator | Related events | Related protocol message | Remarks |
|---|---|---|---|
| FTP connection establishment success rate | FTPConnectionRequest | A mobile terminal uploads an RRC connection request when performing an FTP service | |
| FTP connection establishment duration | FTPConnectionResponse | A mobile terminal receives a message, 220 Service ready for new user, returned by an FTP server | |
| FTP average upload rate | FTPULDataTransferStart | A mobile terminal initiates an upload service PASV message | |
| | FTPULDataTransferComplete | Data upload is complete, and a message, 226 Transfer Finished Successfully, returned by an FTP server is received | |
| | FTPULFirstDataPacket | A mobile terminal uploads a first data packet | |
| | FTPULLastDataPacket | A mobile terminal uploads a last data packet | |
| FTP average download rate | FTPDLDataTransferStart | A mobile terminal initiates a download service PORT message | |
| | FTPDLDataTransferComplete | Data download is complete, and a message, 226 Transfer Finished Successfully, returned by an FTP server is received | |
| | FTPDLFirstDataPacket | A terminal downloads a first data packet | |
| | FTPDLLastDataPacket | A terminal downloads a last data packet | |

For the FTP service, once a newly established FTP quintuple is detected, an FTP connection request is initiated until a command "220" is returned by a server end, which indicates that a connection is established successfully; and another returned command indicates failure.

Therefore, by means of statistics on the time of a connection initiated event and a command returned by server event, whether a connection is established successfully may be determined according to a corresponding returned result. By collecting statistics on a ratio of successful connection times to total times of connection initiated events, the FTP connection establishment success rate is obtained.

The FTP connection establishment duration is obtained by means of statistics on the duration from the connection initiated event to the command returned by server event and collecting statistics on an average value of durations obtained during a period of time.

An upload service PASV message event indicates that the mobile terminal starts to upload a file, the receiving of an event that a "226" command is returned by the FTP server indicates that the upload of the file is complete, and other returned commands indicate failure; the duration from the upload service event to the command returned by server event is measured; when the FTP is working in PORT mode, the size of the file contained in a "150" response to the RETR request is resolved; when the FTP is working in PASV mode, the size of the file contained in a "213" command response to the SIZE request is resolved; the ratio of the size of the file to the upload time is calculated to obtain the FTP average upload rate.

A download service PORT message event indicates that the mobile terminal starts to download a file, the receiving of an event that a "226" command is returned by the FTP server indicates that the download of the file is complete, and other returned commands indicate failure; the duration from the download service event to the command returned by server event is measured; when the FTP is working in PORT mode, the size of the file contained in a "150" response to the RETR request is resolved; when the FTP is working in PASV mode, the size of the file contained in a "213" command response to the SIZE request is resolved; the ratio of the size of the file to the download time is calculated to obtain the average download rate.

4. For the DNS service, messages corresponding to events listed in Table 5 may be identified and resolved.

TABLE 5

| KQI indicator | Related events | Reled protocol message | Remarks |
|---|---|---|---|
| DNS resolution success rate | DNSResponse | DNS Query message | |
| DNS resolution relay | DNSQuery | DNS Response message | |

The DNS is a standard protocol, and the major events are DNS Query event and DNSResponse event, which correspond to a Query field and a Response field of the DNS message respectively; if the DNS Response field is resolved into " ", the DNS resolution is determined to be a success. Therefore, the ratio of the times of DNS resolution success to the times of request during a period of time is measured to obtain the DNS resolution success rate. Time points corresponding to every DNSQuery event and DNSResponse event are recorded to obtain the DNS resolution duration; an average of the DNS resolution duration during a period of time is measured to obtain the DNS resolution delay.

5. For the TCP service, messages corresponding to events listed in Table 6 may be identified and resolved.

TABLE 6

| KQI indicator | Related events | Related protocol message | Remarks |
|---|---|---|---|
| TCP establishment success rate | TCPSYNAttempt | Uplink TCP connection establishment synchronization request message | |
| TCP establishment delay | TCPSYNACK | Downlink TCP connection establishment synchronization message | |
| | TCP_ACK | Uplink TCP connection establishment ACK message | |

The TCP standard protocol establishes a link by means of a three-way handshake protocol; a connection establishment under the TCP standard protocol includes three events: TCPSYNAttempt, TCPSYNACK and TCP_ACK. By identifying a Header field in a TCP message, and meanwhile recording time points corresponding to two events, TCPSYNAttempt and TCP_ACK, of each TCP connection, the TCP connection establishment duration is obtained. By collecting statistics on the time corresponding to the two events, TCPSYNAttempt and TCP_ACK, of each TCP connection, the TCP connection establishment delay is obtained.

The foregoing specific message of each Internet access service and the identifying process may be determined according the corresponding service process, which will not be further elaborated one by one.

Figure 5:
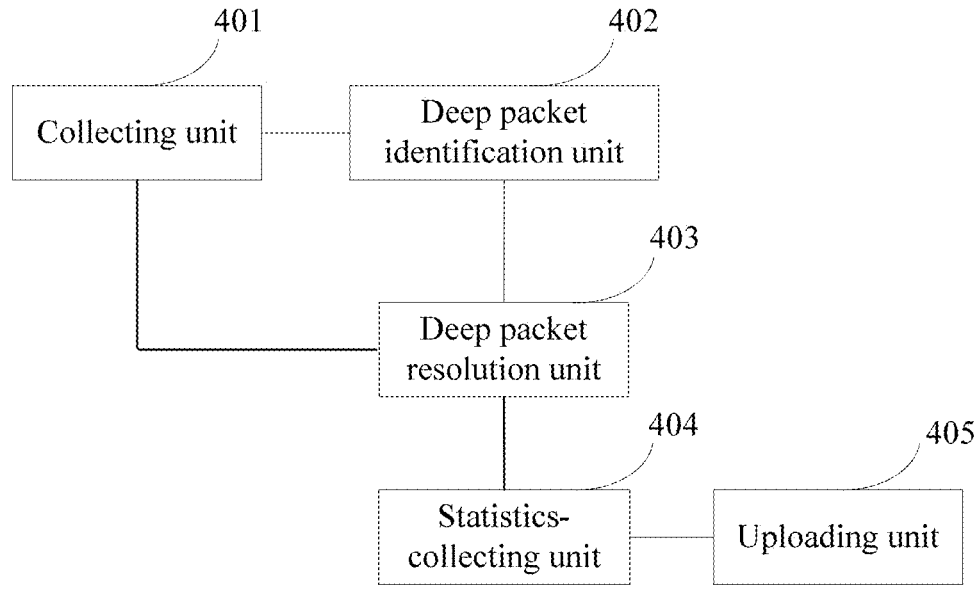
FIG. 5 is a schematic structural diagram of a mobile terminal according to an embodiment of the present disclosure.

Correspondingly, an embodiment of the present disclosure further provides a mobile terminal, as shown in FIG. 5 which is a schematic structural diagram of the mobile terminal.

In this embodiment, the mobile terminal includes a collecting unit 401 configured to collect an IP data packet of an Internet access service, a deep packet identification unit 402 configured to identify an Internet access service type corresponding to the IP data packet collected by the collecting unit 401, a deep packet resolution unit 403 configured to perform deep packet resolution on the IP data packet to obtain a resolution result, a statistics collecting unit 404 configured to collect statistics on a key quality indicator of the Internet access service corresponding to the Internet access service type according to the resolution result of the IP data packet obtained by the deep packet resolution unit 403, and an uploading unit 405 configured to upload the key quality indicator obtained by the statistics collecting unit 403 by means of statistics to a network server, so that the network server monitors quality of the Internet access service of the mobile terminal according to the key quality indicator.

In this embodiment of the present disclosure, there may be a plurality of Internet access service types. For example, the Internet access service type corresponding to the IP data packet may be a HTTP service or a WAP service.

Correspondingly, the deep packet resolution unit 403 may resolve a network-layer IP data packet of the HTTP web browsing service or the WAP service to determine whether the network-layer IP data packet includes a message representing a HTTPHomePageRequest event, a HTTPHomePageResponse event, a HTTPGet event, a HTTPFail event, a HTTPDataTransferStart event, and a HTTPDataTransferComplete event. The resolution result includes one or more of the HTTPHomePageRequest event, the HTTPHomePageResponse event, the HTTPGet event, the HTTPFail event, the HTTPDataTransferStart event, and the HTTPDataTransferComplete event.

Correspondingly, the statistics collecting unit 404 may collect statistics on one or more indicators of the home page response success rate, the home page response duration, the page refresh success rate, the page refresh duration, and the page download rate of the HTTP web browsing service or the WAP service according to the resolution result of the deep packet resolution unit 403. Specifically, the statistics collecting unit 404 may collect statistics on the home page response success rate and the home page response duration of the Internet access service according to the HTTPHomePageRequest event and the HTTPHomePageResponse event during a set period of time, and/or collect statistics on the page refresh success rate according to the HTTPGet event and the HTTPFail event during a set period of time, and/or collect statistics on the page refresh duration and the page download rate according to the HTTPDataTransferStart event and the HTTPDataTransferComplete event.

The Internet access service type corresponding to the IP data packet may further be an FTP service.

Correspondingly, the deep packet resolution unit 403 may resolve a network-layer IP data packet of the FTP service to determine whether the network-layer IP data packet includes a message representing a FTPConnectionRequest event, a FTPConnectionResponse event, a FTPULDataTransferStart event, a FTPULDataTransferComplete event, a FTPULFirstDataPacket event, a FTPULLastDataPacket event, a FTPDLDataTransferStart event, a FTPDLDataTransferComplete event, a FTPDLFirstDataPacket event, and a FTPDLLastDataPacket event. The resolution result includes one or more of the FTPConnectionRequest event, the FTPConnectionResponse event, the FTPULDataTransferStart event, the FTPULDataTransferComplete event, the FTPULFirstDataPacket event, the FTPULLastDataPacket event, the FTPDLDataTransferStart event, the FTPDLDataTransferComplete event, the FTPDLFirstDataPacket event, and the FTPDLLastDataPacket event.

Correspondingly, the statistics collecting unit 304 may resolve one or more indicators of the FTP service of the connection establishment success rate, the connection establishment duration, the average upload rate, and the average download rate according to the resolution result of the deep packet resolution unit 403. Specifically, the statistics collecting unit 404 may collect statistics on the connection establishment success rate and the connection establishment duration of the FTP service according to the FTPConnectionRequest event and the FTPConnectionResponse event during a set period of time; and/or collect statistics on the average upload rate of the FTP service according to the FTPULDataTransferStart event, the FTPULDataTransferComplete event, the FTPULFirstDataPacket event, and the FTPULLastDataPacket event; and/or collect statistics on the average download rate of the FTP service according to the FTPDLDataTransferStart event, the FTPDLDataTransferComplete event, the FTPDLFirstDataPacket event, and the FTPDLLastDataPacket event.

The Internet access service type corresponding to the IP data packet may further be a DNS service.

Correspondingly, the deep packet resolution unit 403 may resolve a network-layer IP data packet of the DNS service to determine whether the network-layer IP data packet includes a message representing the DNSResponse event and the DNSQuery event. The resolution result includes one or more of the DNS Query event and the DNSResponse event.

Correspondingly, the statistics collecting unit 404 may collect statistics on one or more indicators of the DNS service resolution success rate and the resolution delay according to the resolution result of the deep packet resolution unit 403, Specifically, the statistics collecting unit 404 may collect statistics on a resolution success rate of the DNS service and/or a resolution delay of the DNS service according to the DNS Query event and the DNSResponse event during a set period of time.

The Internet access service type corresponding to the IP data packet may further be a TCP service.

Correspondingly, the deep packet resolution unit 403 may resolve a network-layer IP data packet of the TCP service to determine whether the network-layer IP data packet includes a message representing a following event: a TCPSYNAttempt event or a TCP_ACK event. The resolution result includes one or more of the TCPSYNAttempt event and the TCP_ACK event.

Correspondingly, the statistics collecting unit 404 may collect statistics on one or more indicators of the TCP service establishment success rate and the establishment delay according to the resolution result of the deep packet resolution unit 403. Specifically, the statistics collecting unit 404 may collect statistics on an establishment success rate of the TCP service and/or an establishment delay of the TCP service according to the TCPSYNAttempt event and/or the TCP_ACK event.

A process of uploading, by the uploading unit 405, the key quality indicator obtained by the statistics collecting unit 404 to the network server may be uploading immediately after the statistics result of the statistics collecting unit 404 is obtained, or uploading periodically.

In this embodiment of the present disclosure, the mobile terminal mentioned may be a laptop computer laptop, a mobile phone, a data card, a tablet computer, a smart terminal, a human-computer interaction terminal, an electronic book, or another terminal device having a display function.

Therefore, according to the mobile terminal according to an embodiment of the present disclosure, the mobile terminal collects an IP data packet of an Internet access service of the mobile terminal, identifies an Internet access service type corresponding to the IP data packet, performs deep packet resolution on the IP data packet, collects statistics on a key quality indicator of the Internet access service of the mobile terminal according to a resolution result, and uploads the key quality indicator obtained by means of statistics to a network server, so that the network server monitors quality of the Internet access service of the mobile terminal according to the key quality indicator, thereby implementing accurate monitoring of network quality for the mobile terminal, and providing an accurate decision-making basis for network optimization In order to further improve a network operation and maintenance capability of a network side so as to provide an accurate decision-making basis for network optimization, in another embodiment of the present disclosure, a monitoring policy may further be configured by the network side. In this case, a mobile terminal obtains the monitoring policy from a network server, and monitors an Internet access service according to the monitoring policy.

Figure 6:
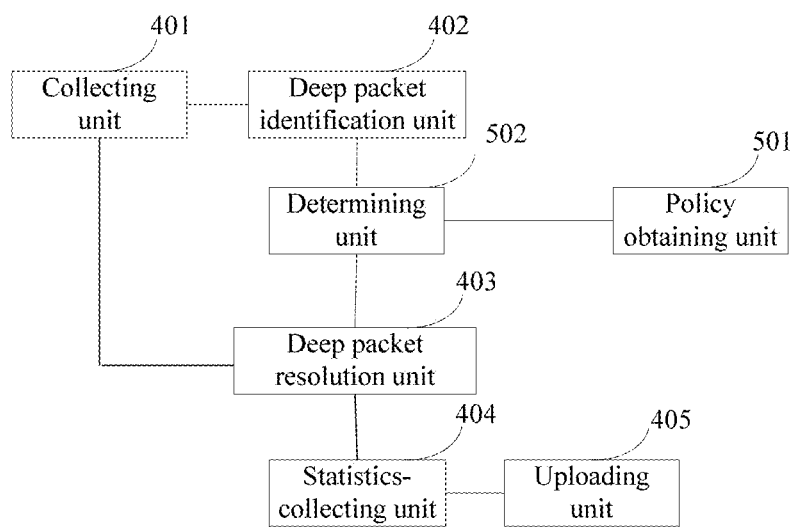
FIG. 6 is another schematic structural diagram of a mobile terminal according to an embodiment of the present disclosure.

FIG. 6 is another schematic structural diagram of a mobile terminal according to an embodiment of the present disclosure.

Unlike an embodiment illustrated in FIG. 5, in this embodiment, the mobile terminal further includes a policy obtaining unit 501 configured to obtain a monitoring policy from the network server, where the monitoring policy is used to indicate an Internet access service type that needs to be monitored and a key quality indicator corresponding to the Internet access service type, and a determining unit 502 configured to determine, according to the monitoring policy obtained by the policy obtaining unit 501 and the Internet access service type corresponding to the IP data packet determined by the deep packet identification unit 402, whether to perform key quality indicator analysis on the Internet access service; and if it is determined that the key quality indicator analysis be performed on the Internet access service, trigger the deep packet resolution unit 403 to perform deep packet resolution on the IP data packet; otherwise, trigger the collecting unit 401 to drop the IP data packet.

The mobile terminal according to an embodiment of the present disclosure, by planting a DPI technology a mobile terminal side, monitors an Internet access service of the mobile terminal, collects statistics on a key quality indicator of the Internet access service of the mobile terminal, and uploads the key quality indicator obtained by means of statistics to a network server, so as so that the network server monitors quality of the Internet access service of the mobile terminal according to the key quality indicator, thereby implementing accurate monitoring of network quality for the mobile terminal. Moreover, by uniformly configuring a monitoring policy at a network side, the monitoring may be performed more purposely.

It should be noted that the mobile terminal in an embodiment of the present disclosure may be a wireless mobile terminal that implements Internet access by using any wireless network technology, such as 2G, 3G, or LTE.

Figure 7:
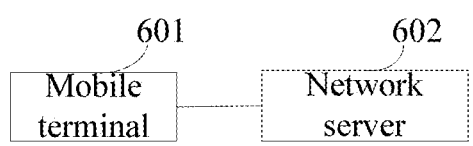
FIG. 7 is a schematic diagram of a system for monitoring quality of an Internet access service of a mobile terminal according to an embodiment of the present disclosure.

Correspondingly, an embodiment of the present disclosure further provides a system for monitoring quality of an Internet access service of a mobile terminal, as shown in FIG. 7 which is a schematic diagram of the system.

The system includes a mobile terminal 601 and a network server 602, where the mobile terminal 601 is configured to collect an IP data packet of the Internet access service of the mobile terminal 601, identify an Internet access service type corresponding to the IP data packet, perform deep packet resolution on the IP data packet to obtain a resolution result, collect statistics on a key quality indicator of the Internet access service corresponding to the Internet access service type according to the resolution result of the IP data packet, and upload the key quality indicator obtained by means of statistics to the network server, and the network server 602 is configured to receive the key quality indicator uploaded by the mobile terminal 601, and monitor quality of the Internet access service of the mobile terminal according to the key quality indicator Further, the network server 602 is further configured to configure a monitoring policy, where the monitoring policy is used to indicate an Internet access service type that needs to be monitored and a key quality indicator corresponding to the Internet access service type.

Correspondingly, the mobile terminal 601 is further configured to obtain the monitoring policy from the network server 602, and according to the monitoring policy and the Internet access service type corresponding to the IP data packet, when determining that key quality indicator analysis needs to be performed on the Internet access service, collect statistics on the key quality indicator of the Internet access service according to the Internet access service type corresponding to the IP data packet, and when determining that key quality indicator analysis does not need to be performed on the Internet access service, drop the IP data packet It should be understood that a purpose/function for the mobile terminal to report an indicator to the server may be providing a decision-making basis for a network operator to perform network planning and network optimization.

The system for monitoring quality of an Internet access service of a mobile terminal according to an embodiment of the present disclosure, by planting a DPI technology a mobile terminal side, monitors an Internet access service of the mobile terminal, collects statistics on a key quality indicator of the Internet access service of the mobile terminal, and uploads the key quality indicator obtained by means of statistics to a network server, so as so that the network server monitors quality of the Internet access service of the mobile terminal according to the key quality indicator, thereby implementing accurate monitoring of network quality for the mobile terminal. Moreover, by uniformly configuring a monitoring policy at a network side, the monitoring may be performed more purposely.

Each embodiment in the specification is described in a progressive manner. The same or similar parts in the embodiments are merely references to each other. Each embodiment illustrates in emphasis what is different from the other embodiments. In particular, for the device and system embodiments, because they are basically similar to the method embodiments, the apparatus embodiments are described simply, and relevant parts may be obtained with reference to the parts described in the method embodiments. The described device embodiment is merely exemplary. The units described as separate parts may be or may not be physically separate, and parts displayed as units may be or may not be physical units, and may be located in one position, or may be distributed on a plurality of network units. A part or all of the modules may be selected according to actual needs to achieve the objectives of the solutions of the embodiments. A person of ordinary skill in the art may understand and implement the embodiments of the present disclosure without creative efforts.

The foregoing describes the embodiments of the present disclosure in detail. The present disclosure is described in this specification by using specific examples. The foregoing embodiments are described to help understand the method and the device of the present disclosure. In addition, a person of ordinary skill in the art may change the specific implementation manners and application scope according to the idea of the present disclosure. Therefore, the specification shall not be construed as a limitation on the present disclosure.

What is claimed is:

1. A method for monitoring quality of an Internet access service of a mobile terminal comprising:
    collecting, by the mobile terminal, an Internet Protocol (IP) data packet of the Internet access service;
    identifying, by the mobile terminal, an Internet access service type corresponding to the IP data packet;
    performing, by the mobile terminal, deep packet resolution on the IP data packet to obtain a resolution result:
    collecting statistics, by the mobile terminal, on a key quality indicator of the Internet access service corresponding to the Internet access service type according to the resolution result of the IP data packet; and
    uploading, by the mobile terminal, the key quality indicator obtained by means of statistics to a network server, so that the network server monitors quality of the Internet access service of the mobile terminal according to the key quality indicator;
    wherein, prior to performing deep packet resolution on the IP data packet, the method further comprises: determining, according to a configured monitoring policy and the Internet access service type corresponding to the IP data packet, whether to perform key quality indicator analysis on the Internet access service, wherein the monitoring policy is used to indicate an Internet access service type that needs to be monitored and a key quality indicator corresponding to the Internet access service type; and
    performing deep packet resolution on the IP data packet when a determination is made to perform key quality indicator analysis on the Internet access service.

2. The method according to claim 1, wherein identifying an Internet access service type corresponding to the IP data packet comprises identifying the Internet access service type corresponding to the IP data packet by using any one or more identifying manners selected from a group consisting essentially of port identification, feature identification, and correlation identification.

3. The method according to claim 1, wherein the Internet access service type corresponding to the IP data packet comprises a Hypertext Transfer Protocol (HTTP) web browsing service or a Wireless Application Protocol (WAP) service, wherein performing deep packet resolution on the IP data packet to obtain a resolution result comprises resolving a network-layer IP data packet of the HTTP web browsing service or the WAP service to determine whether the network-layer IP data packet comprises a message representing a HTTPHomePageRequest event, a HTTPHomePageResponse event, a HTTPGet event, a HTTPFail event, a HTTPDataTransferStart event, or a HTTPDataTransferComplete event, wherein the resolution result comprises one or more of the HTTPHomePageRequest event, the HTTPHomePageResponse event, the HTTPGet event, HTTPFail event, the HTTPDataTransferStart event, and the HTTPDataTransferComplete event, and wherein collecting statistics on a key quality indicator of the Internet access service corresponding to the Internet access service type according to the resolution result of the IP data packet comprises collecting statistics on a home page response success rate and a home page response duration of the Internet access service according to the HTTPHomePageRequest event and the HTTPHomePageResponse event during a set period of time.

4. The method according to claim 1, wherein the Internet access service type corresponding to the IP data packet comprises a Hypertext Transfer Protocol (HTTP) web browsing service or a Wireless Application Protocol (WAP) service, wherein performing deep packet resolution on the IP data packet to obtain a resolution result comprises resolving a network-layer IP data packet of the HTTP web browsing service or the WAP service to determine whether the network-layer IP data packet comprises a message representing a HTTPHomePageRequest event, a HTTPHomePageResponse event, a HTTPGet event, a HTTPFail event, a HTTPDataTransferStart event, or a HTTPDataTransferComplete event, wherein the resolution result comprises one or more of the HTTPHomePageRequest event, the HTTPHomePageResponse event, the HTTPGet event, HTTPFail event, the HTTPDataTransferStart event, and the HTTPDataTransferComplete event, and wherein collecting statistics on a key quality indicator of the Internet access service corresponding to the Internet access service type according to the resolution result of the IP data packet comprises collecting statistics on a page refresh success rate of the Internet access service according to the HTTPGet event and the HTTPFail event during a set period of time.

5. The method according to claim 1, wherein the Internet access service type corresponding to the IP data packet comprises a Hypertext Transfer Protocol (HTTP) web browsing service or a Wireless Application Protocol (WAP) service, wherein performing deep packet resolution on the IP data packet to obtain a resolution result comprises resolving a network-layer IP data packet of the HTTP web browsing service or the WAP service to determine whether the network-layer IP data packet comprises a message representing a HTTPHomePageRequest event, a HTTPHomePageResponse event, a HTTPGet event, a HTTPFail event, a HTTPDataTransferStart event, or a HTTPDataTransferComplete event, wherein the resolution result comprises one or more of the HTTPHomePageRequest event, the HTTPHomePageResponse event, the HTTPGet event, HTTPFail event, the HTTPDataTransferStart event, and the HTTPDataTransferComplete event, and wherein collecting statistics on a key quality indicator of the Internet access service corresponding to the Internet access service type according to the resolution result of the IP data packet comprises collecting statistics on a refresh duration of the Internet access service and a download rate of the Internet access service according to the HTTPDataTransferStart event and the HTTPDataTransferComplete event.

6. The method according to claim 1, wherein the Internet access service type corresponding to the IP data packet is an FTP service, wherein performing deep packet resolution on the IP data packet to obtain a resolution result comprises resolving a network-layer IP data packet of the File Transfer Protocol (FTP) service to determine whether the network-layer IP data packet comprises a message representing a FTPConnectionRequest event, a FTPConnectionResponse event, a FTPULDataTransferStart event, a FTPULDataTransferComplete event, a FTPULFirstDataPacket event, a FTPULLastDataPacket event, a FTPDLDataTransferStart event, a FTPDLDataTransferComplete event, a FTPDLFirstDataPacket event, or a FTPDLLastDataPacket event, wherein the resolution result comprises one or more of the FTPConnectionRequest event, the FTPConnectionResponse event, the FTPULDataTransferStart event, the FTPULDataTransferComplete event, the FTPULFirstDataPacket event, the FTPULLastDataPacket event, the FTPDLDataTransferStart event, the FTPDLDataTransferComplete event, the FTPDLFirstDataPacket event, and the FTPDLLastDataPacket event, and wherein collecting statistics on a key quality indicator of the Internet access service according to the resolution result of the IP data packet comprises collecting statistics on a connection establishment success rate and a connection establishment duration of the FTP service according to the FTPConnectionRequest event and the FTPConnectionResponse event during a set period of time.

7. The method according to claim 1, wherein the Internet access service type corresponding to the IP data packet is an FTP service, wherein performing deep packet resolution on the IP data packet to obtain a resolution result comprises resolving a network-layer IP data packet of the File Transfer Protocol (FTP) service to determine whether the network-layer IP data packet comprises a message representing a FTPConnectionRequest event, a FTPConnectionResponse event, a FTPULDataTransferStart event, a FTPULDataTransferComplete event, a FTPULFirstDataPacket event, a FTPULLastDataPacket event, a FTPDLDataTransferStart event, a FTPDLDataTransferComplete event, a FTPDLFirstDataPacket event, or a FTPDLLastDataPacket event, wherein the resolution result comprises one or more of the FTPConnectionRequest event, the FTPConnectionResponse event, the FTPULDataTransferStart event, the FTPULDataTransferComplete event, the FTPULFirstDataPacket event, the FTPULLastDataPacket event, the FTPDLDataTransferStart event, the FTPDLDataTransferComplete event, the FTPDLFirstDataPacket event, and the FTPDLLastDataPacket event, and wherein collecting statistics on a key quality indicator of the Internet access service according to the resolution result of the IP data packet comprises collecting statistics on an average upload rate of the FTP service according to the FTPULDataTransferStart event, the FTPULDataTransferComplete event, the FTPULFirstDataPacket event, and the FTPULLastDataPacket event.

8. The method according to claim 1, wherein the Internet access service type corresponding to the IP data packet is an FIT service, wherein performing deep packet resolution on the IP data packet to obtain a resolution result comprises resolving a network-layer IP data packet of the File Transfer Protocol (FTP) service to determine whether the network-layer IP data packet comprises a message representing a FTPConnectionRequest event, a FTPConnectionResponse event, a FTPULDataTransferStart event, a FTPULDataTransferComplete event, a FTPULFirstDataPacket event, a FTPULLastDataPacket event, a FTPDLDataTransferStart event, a FTPDLDataTransferComplete event, a FTPDLFirstDataPacket event, or a FTPDLLastDataPacket event, wherein the resolution result comprises one or more of the FTPConnectionRequest event, the FTPConnectionResponse event, the FTPULDataTransferStart event, the FTPULDataTransferComplete event, the FTPULFirstDataPacket event, the FTPULLastDataPacket event, the FTPDL-DataTransferStart event, the FTPDLDataTransferComplete event, the FTPDLFirstDataPacket event, and the FTPDL-LastDataPacket event, and wherein collecting statistics on a key quality indicator of the Internet access service according to the resolution result of the IP data packet comprises collecting statistics on an average download rate of the FIP service according to the FTPDLDataTransferStart event, the FTPDLDataTransferComplete event, the FTPDLFirstData-Packet event, and the FTPDLLastDataPacket event.

9. The method according to claim 1, wherein the Internet access service type corresponding to the IP data packet is a Domain Name System (DNS) service, wherein performing deep packet resolution on the IP data packet to obtain a resolution result comprises resolving a network-layer IP data packet of the DNS service to determine whether the network-layer IP data packet comprises a message representing a DNSQuery event or a DNSResponse event, wherein the resolution result comprises one or more of the DNSQuery event and the DNSResponse event, and wherein collecting statistics on a key quality indicator of the Internet access service according to the resolution result of the IP data packet comprises collecting statistics on a resolution success rate of the DNS service or a resolution delay of the DNS service according to the DNSQuery event and the DNSResponse event during a set period of time.

10. The method according to claim 1, wherein the Internet access service type corresponding to the IP data packet is a Transmission Control protocol (TCP) service, wherein performing deep packet resolution on the IP data packet to obtain a resolution result comprises resolving a network-layer IP data packet of the TCP service to determine whether the network-layer IP data packet comprises a message representing a TCPSYNAttempt event or a TCP_ACK event, wherein the resolution result comprises one or more of the TCPSYN-Attempt event and the TCP_ACK event, and wherein collecting statistics on a key quality indicator of the Internet access service according to the resolution result of the IP data packet comprises collecting statistics on an establishment success rate of the TCP service or an establishment delay of the TCP service according to the TCPSYNAttempt event and TCP_ACK event during a set period of time.

11. A mobile terminal comprising: a processor and a memory having instructions stored thereon, the instructions being executable by the processor to:
  collect an Internet Protocol (IP) data packet of an Internet access service;
  identify an Internet access service type corresponding to the IP data packet;
  perform deep packet resolution on the IP data packet to obtain a resolution result;
  collect statistics on a key quality indicator of the Internet access service corresponding to the Internet access service type according to the resolution result of the IP data packet;
  upload the key quality indicator to a network server, so that the network server monitors quality of the Internet access service of the mobile terminal according to the key quality indicator;
  obtain a monitoring policy from the network server, wherein the monitoring policy is used to indicate an Internet access service type that needs to be monitored and a key quality indicator corresponding to the Internet access service type;
  determine, according to the monitoring policy and the Internet access service type corresponding to the IP data packet, whether to perform key quality indicator analysis on the Internet access service; and
  perform deep packet resolution on the IP data packet when it is determined that the key quality indicator analysis be performed on the Internet access service.

12. The mobile terminal according to claim 11, wherein the Internet access service type corresponding to the IP data packet comprises a Hypertext Transfer Protocol (HTTP) web browsing service or a Wireless Application Protocol (WAP) service, wherein the processor is configured to resolve a network-layer IP data packet of the HTTPweb browsing service or the WAP service to determine whether the network-layer IP data packet comprises a message representing a HTTPHomePageRequest event, a HTTPHomePageResponse event, a HTTPGet event, a HTTPFail event, a HTTP-DataTransferStart event, or a HTTPDataTransferComplete event, wherein the resolution result comprises one or more of the HTTPHomePageRequest event, the HTTPHomePageResponse event, the HTTPGet event, the HTTPFail event, the HTTPDataTransferStart event, and the HTTPDataTransfer-Complete event, and wherein the processor is further configured to:
  collect statistics on a home page response success rate and a home page response duration of the Internet access service according to the HTTPHomePageRequest event and the HTTPHomePageResponse event during a set period of time;
  collect statistics on a page refresh success rate of the Internet access service according to the HTTPGet event and the HTTPFail event during a set period of time; or
  collect statistics on a refresh duration of the Internet access service and a download rate of the Internet access service according to the HTTPDataTransferStart event and the HTTPDataTransferComplete event.

13. The mobile terminal according to claim 11, wherein the Internet access service type corresponding to the IP data packet is an File Transfer Protocol (FTP) service, wherein the processor is configured to resolve a network-layer IIP data packet of the FTP service to determine whether the network-layer IP data packet comprises a message representing a FTPConnectionRequest event, a FTPConnectionResponse event, a FTPULDataTransferStart event, a FTPUL-DataTransferComplete event, a FTPULFirstDataPacket event, a FTPULLastDataPacket event, a FTPDLDataTransferStart event, a FTPULDataTransferComplete event, a FrPOLFirstDataPacket event, or a FTPDLLastDataPacket event, and wherein the processor is further configured to:
  collect statistics on a connection establishment success rate and a connection establishment duration of the FTP service according to the FTPConnectionRequest event and the FTPConnectionResponse event during a set period of time;
  collect statistics on an average upload rate of the FTP service according to the FTPULDataTransferStart event, the FTPULDataTransferComplete event, the FTPULFirstDataPacket event, and the FTPULLast-DataPacket event; or
  collect statistics on an average download rate of the FTP service according to the FTPDLDataTransferStart event, the FTPDLDataTransferComplete event, the FTPDLFirstDataPacket event, and the FTPDLLast-DataPacket event.

14. The mobile terminal according to claim 11, wherein the Internet access service type corresponding to the IP data packet is a Domain Name System (DNS) service, wherein the processor is further configured to:

resolve a network-layer IP data packet of the DNS service to determine whether the network-layer IP data packet comprises a message representing a DNSResponse event or a DNSQuery event; and collect statistics on a resolution success rate of the DNS service or a resolution delay of the DNS service according to the DNSQuery event and the DNSResponse event during a set period of time, and wherein the resolution result comprises one or more of the DNSQuery event and the DNSResponse event.

15. The mobile terminal according to claim 11, wherein the Internet access service type corresponding to the IP data packet is a Transmission Control Protocol (TCP) service, wherein the processor is further configured to:

resolve a network-layer IP data packet of the TCP service to determine whether the network-layer IP data packet comprises a message representing a TCPSYNAttempt vent or a TCP_ACK event; and collect statistics on an establishment success rate of the TCP service or an establishment delay of the TCP service according to the TCPSYNAttempt event and TCP_ACK event during a set period of time, and wherein the resolution result comprises one or more of the TCPSYNAttempt event and the TCP_ACK event.

16. A system for monitoring quality of an Internet access service of a mobile terminal comprising:

a network server; and a mobile terminal, the mobile terminal comprises a processor configured to execute the following steps:

collect an IP data packet of the Internet access service;

identify an Internet access service type corresponding to the IP data packet;

perform deep packet resolution on the IP data packet to obtain a resolution result;

collect statistics on a key quality indicator of the Internet access service corresponding to the Internet access service type according to the resolution result of the IP data packet; and upload the key quality indicator obtained by means of statistics to the network server, and wherein the network server is configured to:

receive the key quality indicator uploaded by the mobile terminal; and monitor quality of the Internet access service of the mobile terminal according to the key quality indicator;

obtain a monitoring policy from the network server, wherein the monitoring policy is used to indicate an Internet access service type that needs to be monitored and a key quality indicator corresponding to the Internet access service type;

determine, according to the monitoring policy and the Internet access service type corresponding to the IP data packet, whether to perform key quality indicator analysis on the Internet access service; and perform deep packet resolution on the IP data packet when it is determined that the key quality indicator analysis be performed on the Internet access service.

17. The system according to claim 16, wherein the network server is further configured to configure a monitoring policy, wherein the monitoring policy is used to indicate an Internet access service type that needs to be monitored and a key quality indicator corresponding to the Internet access service type, and wherein the processor is further configured to:

obtain the monitoring policy from the network server;

collect statistics on the key quality indicator of the Internet access service according to the Internet access service type corresponding to the IP data packet when determining that key quality indicator analysis needs to be performed on the Internet access service according to the monitoring policy and the Internet access service type corresponding to the IP data packet; and drop the IP data packet when determining that key quality indicator analysis does not need to be performed on the Internet access service.

* * * * *